(No Model.)
O. L. F. BROWNE.
PROCESS OF AND APPARATUS FOR MANUFACTURING SALT.
No. 254,916. Patented Mar. 14, 1882.
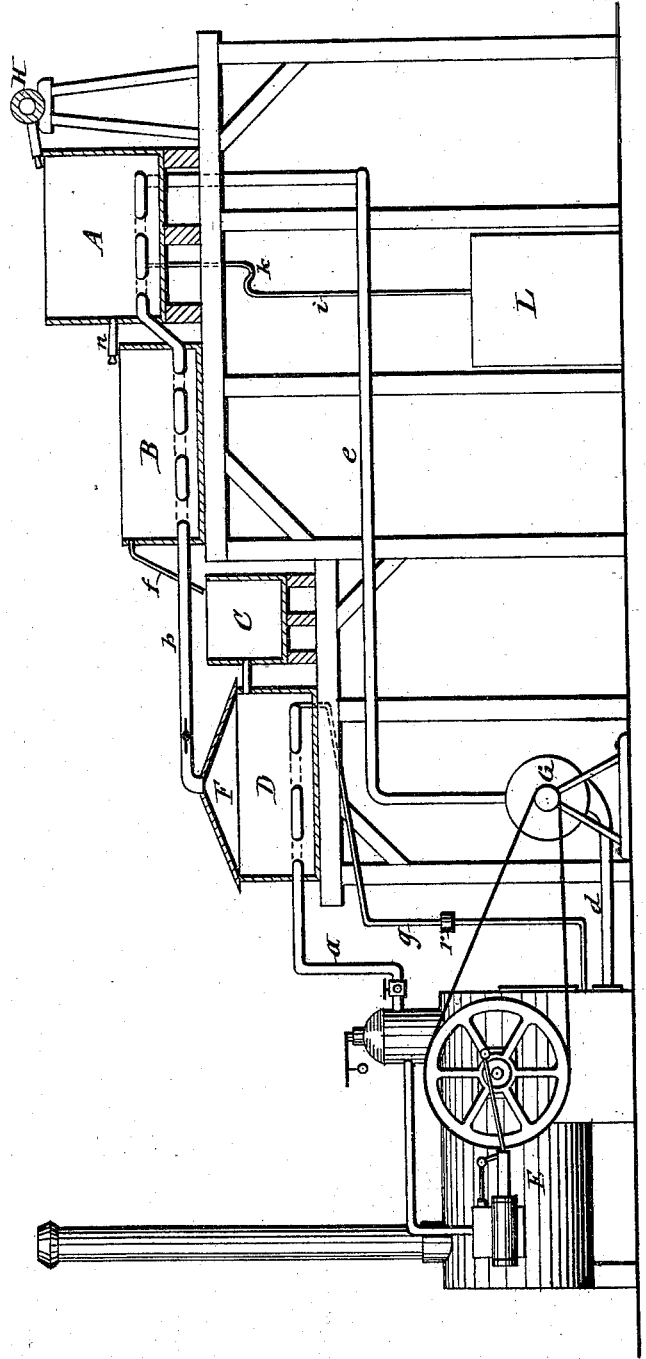
WITNESSES=
Wm. C. Raymond
C. H. Duell
INVENTOR=
Oliver L. F. Browne
per Duell, Lassat Hey
his Attorneys

UNITED STATES PATENT OFFICE.

OLIVER L. F. BROWNE, OF SYRACUSE, NEW YORK.

PROCESS OF AND APPARATUS FOR MANUFACTURING SALT.

SPECIFICATION forming part of Letters Patent No. 254,916, dated March 14, 1882.

Application filed December 13, 1881. (No model.)

*To all whom it may concern:*

Be it known that I, OLIVER L. F. BROWNE, of Syracuse, in the county of Onondaga and State of New York, have invented new and useful Improvements in Processes of and Apparatus for Manufacturing Salt, of which the following, taken in connection with the accompanying drawing, is a full, clear, and exact description.

The nature of this invention consists in an improved method and means of purifying and evaporating natural brine in the manufacture of salt, all as hereinafter fully explained, and specifically set forth in the claims.

The annexed drawing represents a side elevation of a salt-water-evaporating apparatus embodying my invention.

The object of this invention is to apply the primary and most intense heat to the final evaporating-vessel, which receives the purified brine and reduces the same to salt, and to employ the vapor generated in the final evaporating-vessel as the heating agent for those vessels in which the brine is brought to saturation and purified preparatory to its final reduction to salt, thereby greatly economizing in heat, and obviating to a great extent the loss of heat and retardation of the evaporating process incident to the adhesion of the plaster and other incrusting impurities of the brine to the surfaces of the vapor or steam ducts which pass through the several vessels or tanks.

Referring to the accompanying drawings, A represents a preliminary heating-tank, which by a suitable conduit, H, receives the brine either direct from its natural source or from the reservoir or cistern usually employed about salt-water-evaporating works.

B is a tank or vessel, arranged to receive the brine from the reservoir A by means of a faucet, $n$, and designed to bring said brine to the point of saturation. C is another tank, to which the saturated brine of the tank B is conveyed by a suitable conduit or pipe, $f$. In the tank C the said brine is allowed to precipitate its impurities, the purified brine being drawn from the tank C to a final evaporator or grainer, D, wherein the process of the evaporation of the brine is completed.

The heat required in the process of purifying and evaporating the brine is applied in the following manner:

The initial or primary heating agent is applied to the grainer D, and consists of a steam-generator, E, from whence is extended a steam-pipe, $a$, which passes either through the grainer D, as shown, or under the bottom of same in the form of a steam-jacket, so as to effectually heat the contents of said grainer. A pipe, $g$, extended from the end of the aforesaid steam-pipe or steam-jacket back to the water-space of the boiler or steam-generator E, and provided with a suitable check-valve or injector, $r$, returns the water of condensation to said steam-generator.

The vapor emitted from the brine in process of evaporation and graining in the grainer D is utilized as a secondary heating agent by the employment of the following instrumentalities, viz: Over the grainer D is placed a removable cover, F, adapted to gather the vapor arising from the grainer, and from said cover is extended a vapor-duct, $b$, which passes either through the saturating-tank B or envelopes the bottom and sides thereof, so as to heat the brine to be saturated.

If it is found that the heat is not entirely absorbed from the vapor-duct $b$, the remaining heat may be further utilized by extending the vapor-duct through the tank A for the purpose of heating the crude brine before it enters the saturating-tank B.

To the end of the vapor-duct $b$ is connected a pipe, $c$, which communicates with the induction-port of a pump or suction-fan, G, which assists the passage of the vapor through the duct $b$. The discharge of the suction-fan may be connected with the fire-box of the steam-generator E by the pipe $d$, thereby making said fan serve the additional function of a blower.

A drip-pipe, $i$, tapping the vapor-duct $b$, and provided with a suitable trap, K, serves to convey the water of condensation from said vapor-duct to a suitable receptacle, L, in which to collect said water for future use.

The process of manufacturing salt by the before-described apparatus is as follows, to wit:

The crude brine is admitted to the tank A, in which it is partially heated, and thence introduced into the tank B. In the latter the brine is further heated to such a temperature and brought to that degree of saturation at which oxide of iron, carbonate of lime, and the usual sulphates are precipitated. In case the heat is incapable of bringing the brine to the point of saturation as rapidly as required, I admix with said brine a sufficient quantity of salt to increase its density to about 98° to 100° salimeter. The chlorides of calcium and magnesium, with which natural brine is usually contaminated, are neutralized and precipitated by the introduction of sal-soda. After the impurities are precipitated the purified brine is conveyed to the evaporator or grainer D, and there evaporated and reduced to salt.

I do not claim broadly the method of conveying the crude brine through preliminary heating and purifying tanks or vessels to the final evaporating and granulating vessel. Neither do I claim broadly and irrespective of the aforesaid method the employment of the vapor of one evaporating-vessel for heating other evaporating-vessels, as I am aware the same is not new; but I do claim specifically as my invention—

1. The improved process of manufacturing salt from natural brine, consisting in conveying the brine successively through preliminary evaporating and purifying tanks or vessels to the final evaporating and granulating vessel, applying the primary and main heating agent to said granulating-vessel, and collecting from the latter the vapor emitted from the brine in process of granulation, and applying said vapor to the preliminary evaporating and purifying vessels for the purpose of heating the contents thereof, substantially as set forth.

2. The within-described process of manufacturing salt from natural brine, consisting in passing the crude brine through one or more preliminary heating and purifying tanks or vessels to the final evaporating and graining vessel, applying the primary heating agent to the latter and gathering the vapor generated in the said evaporating and graining vessel, and applying said vapor to the preliminary heating and purifying tanks in such a manner as to heat the brine contained therein and bring the same to that degree of saturation at which oxide of iron, carbonate of lime, and the usual attendant sulphates are precipitated, then introducing sal-soda to neutralize and precipitate the chlorides of calcium and magnesium, and drawing off the purified brine into the final evaporating and graining vessel, and there reducing it to salt, substantially as set forth.

3. The within-described process of manufacturing salt from natural brine, consisting in introducing the brine into a suitable receptacle and admixing therewith a sufficient quantity of salt to increase its density to the degree of saturation, then allowing the impurities to settle, and subsequently drawing off the purified and saturated brine and conveying the same to the final evaporator or grainer, and there converting it into salt, substantially as specified.

4. The within-described process of purifying natural brine preparatory to converting the same into salt, consisting in introducing the brine into a suitable vessel or tank, and there heating the brine and admixing with it common salt in sufficient quantity to bring the brine to the point of saturation, thereby precipitating the oxide of iron, carbonate of lime, and the usual sulphates with which natural brine is generally contaminated, then drawing off the purified brine to the final evaporator or grainer, and there reducing it to salt, as set forth.

5. The within-described process of manufacturing salt from natural brine, consisting in introducing the brine into a suitable receptacle, and there heating the brine and admixing with it common salt sufficiently to saturate said brine, and adding thereto sal-soda, and after the resultant elimination of the impurities conveying the purified brine to an evaporating apparatus, and there converting said brine into salt, substantially as set forth.

6. A salt-water-evaporating apparatus comprising a granulator or final evaporator heated by the primary heating agent, vats or suitable receptacles for preliminary heating and purifying of the brine heated by the vapor emitted from the granulator, and suitable ducts for conveying the brine successively through said tank to the granulator, substantially as set forth.

7. A salt-water-evaporating apparatus comprising a grainer or final evaporator heated by the primary heating agent, vats or suitable receptacles for preliminary heating, evaporation, and purification of the brine heated by the vapor emitted from the grainer or final evaporator, and a settling-tank interposed between the said grainer and preliminary heating and purifying tanks, the brine being conveyed successively through the said tanks to the grainer, substantially as set forth.

8. A salt-water evaporator consisting of the following appliances and arrangements, to wit: first, a receptacle for the crude brine; second, a brine-saturating tank or vessel having communicative connection with the first receptacle; third, a tank arranged to receive the saturated brine of the second tank and allow the impurities of said brine to settle; fourth, a grainer or final evaporator communicating with the third tank; fifth, a steam-generator; sixth, a steam-duct extended from the steam-generator through or along the grainer or final evaporator; seventh, a cover applied to the top of the grainer; eighth, a vapor-duct extended from the cover through the brine-saturating tank and the first crude-brine receptacle; and, ninth, a suction fan or pump having its induction-port communicating with the end of the aforesaid vapor-duct and its discharge directed to the fire-box or furnace of the steam-generator, all arranged and operating substantially as described and shown.

9. The receptacle A, saturating-tank B, settling-tank C, and grainer D, communicating successively, as described, in combination with the steam-generator E, having the steam-pipe $a$ extended through the grainer D and returned from there to the steam-generator, the cover F, having the vapor-duct $b$ extended through the saturating-tank B and through the crude-brine receptacle A, and the fan G, having its induction-pipe $e$ connected with the vapor-duct $b$ and the crude-brine receptacle A, and its discharge-pipe $d$ communicating with the fire-box of the steam-generator E, all arranged and combined substantially as described and shown, for the purpose set forth.

In testimony whereof I have hereunto signed my name and affixed my seal, in the presence of two attesting witnesses, at Syracuse, in the county of Onondaga, in the State of New York, this 9th day of December, 1881.

OLIVER L. F. BROWNE. [L. S.]

Witnesses:
E. A. CONKEY,
ED. DAVIER.